Patented Dec. 3, 1929

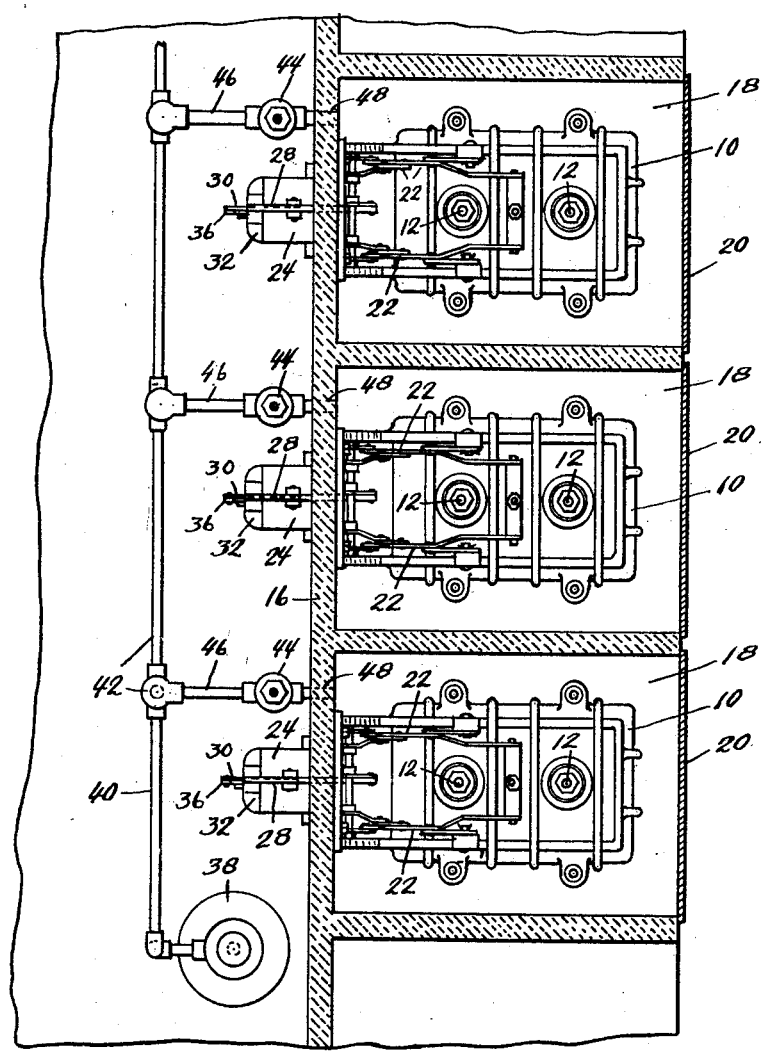

1,737,637

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

METHOD AND APPARATUS FOR PREVENTING FIRES IN THE VICINITY OF ELECTRIC SWITCHES

Application filed June 28, 1927. Serial No. 202,137.

This invention relates to oil immersed electric switches and cell structures in which the switches are enclosed.

When an oil immersed electric switch is opened under a severe overload burning oil or gases may be expelled from the switch casing into the enclosing cell and do damage to auxiliary apparatus therein contained. At times the mixture of oil gases and air within the cell may be in explosive proportions and may explode thereby doing damage to the contents of the cell and to adjacent structures. It is an object of this invention to provide the cell structure with an atmosphere which will not support combustion at the time the switch is opened whereby to prevent explosions and also to extinguish any flame that may be expelled from the switch casing.

Many of the switches are operated but infrequently and may be maintained closed for long periods of time without being required to open under heavy loads. It would, therefore, be useless expense to maintain a non-combustible atmosphere within the cell enclosure continuously and, consequently, a further object of the invention is to provide the cell with an inert or non-combustible atmosphere only at such time as the switch is caused to be opened under load, and preferably upon overload, the atmosphere within the cell at other times being mainly air.

It is a further object of the invention to provide means responsive to the loading of the switch circuit to cause to be introduced into the cell an inert gas in such quantities as when mixed with the air in the cell to render the resulting mixture incapable of exploding and also of supporting combustion.

It is a further object to introduce the inert gas into the cell just before the switch is opened and to delay the opening of the switch until the atmosphere within the cell has been made non-combustible.

A further object is generally to improve electric switches and enclosing cells therefor.

Fig. 2 is a plan view illustrating the application of the invention to a plurality of switch-enclosing cells.

Figure 1:
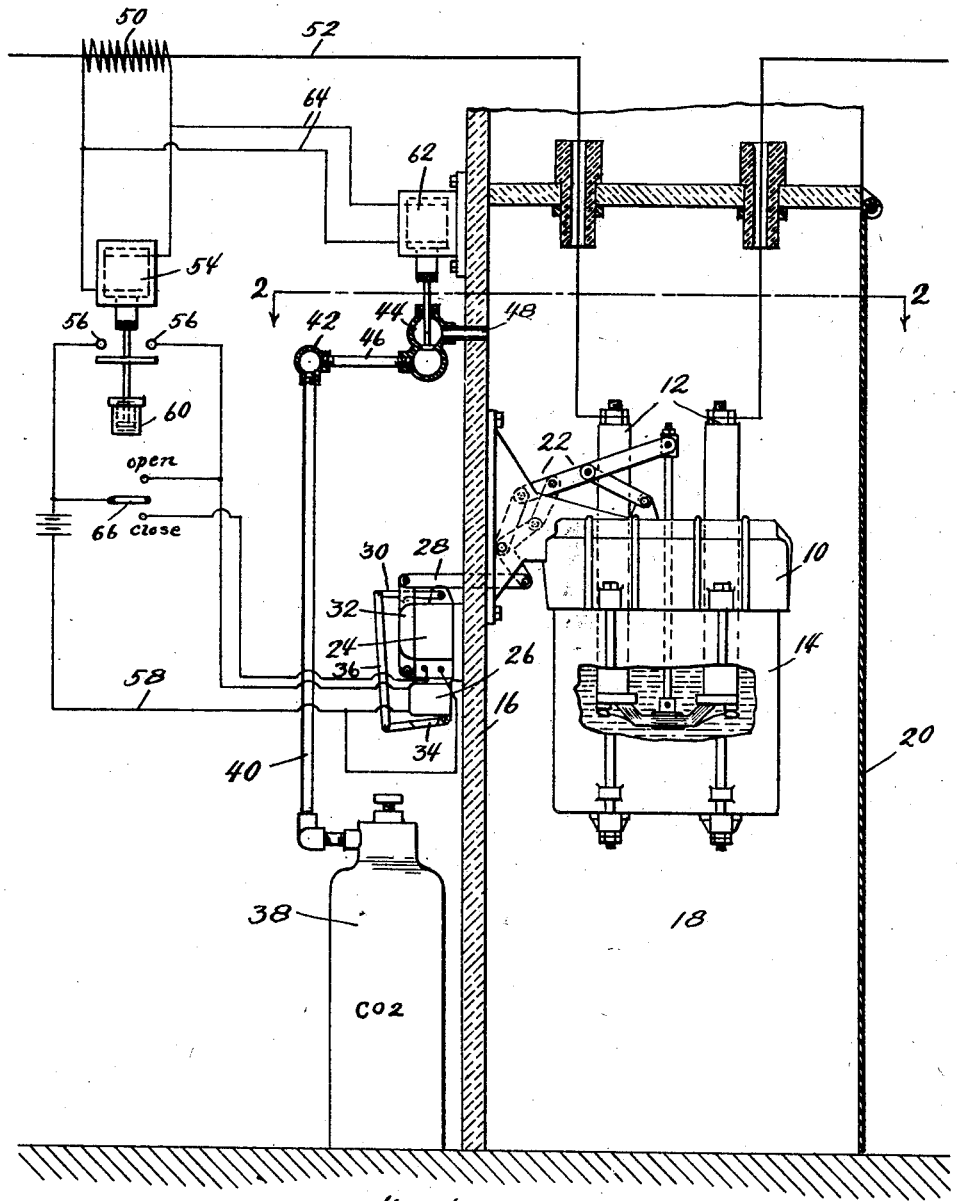
Fig. 1 is a sectional elevation of a cell structure and a switch therein and illustrating diagrammatically the invention.

Figure 1 illustrates diagrammatically an oil immersed electric switch within its enclosing cell and apparatus for introducing an inert gas into the cell. As here shown, the oil immersed electric switch 10 has its terminals 12 immersed in the oil contained in an oil receptacle or casing 14. The switch is supported from the rear wall 16 of the enclosing cell 18. A removable door or cover 20 comprises the front wall of the cell. The cell may be one of a row of similar cells. The cell is of more or less usual construction and is not intended to be gas tight but can have crevices around the door and other small openings through which air can leak into or out of the cell. The switch mechanism 22 of the switch is operated electrically by means of an operating mechanism including a closing magnet 24 and an opening or tripping magnet 26 mounted externally of the cell on the rear wall thereof and connected with the switch mechanism by a connecting rod 28. A latch 30 serves to hold the armature 32 of the closing magnet, and thereby the switch mechanism, releasably in closed position. The latch is tripped by the armature 34 of the opening magnet through a link 36 which pivotally connects said armature and latch 30.

In accordance with this invention means are provided to introduce within the cell an inert gas in such quantities as to make the mixture of the air within the cell and the inert gas incapable of exploding or supporting combustion at the time the switch opens under heavy load. The supply of inert gas may be contained in a high pressure bottle or container 38 which preferably is located without the cell and adjacent the rear wall thereof. The inert gas may be of any suitable nature as nitrogen, carbon dioxide and the like characterized by forming with air a mixture which is incapable of exploding or supporting combustion. The gas preferably is highly compressed so that a large supply can be stored in a comparatively small container. The gas can even be compressed to such a degree that it becomes a liquid, or a gas-forming liquid can be used. The gas bottle 38 is in communication with a pipe 40 which is connected with a manifold pipe 42 which may extend along the rear of a plurality of cells, as in Fig. 2. A normally closed valve 44 is connected with the manifold through the pipe 46 and has an extension 48 which extends through the rear wall of the cell 16 and communicates with the interior of the cell preferably in the upper portion thereof or about where the flame or explosive mixture is most likely to be formed. The switch is adapted to be opened electrically upon overload by means including a current transformer 50 energized from the switch circuit 52. The transformer is connected with the actuating coil of a time-controlled tripping relay 54 which is adapted when sufficiently energized to close a pair of contacts 56 and complete the circuit through the tripping circuit 58 and energize the tripping magnet 26 and thereby open the switch. The tripping relay 54 is provided with a dash pot 60 or other suitable means to delay the closing of the tripping circuit 58 for a small and suitable period of time after the overload current at which the relay is set to operate has been impressed on the switch circuit 52. The valve 44 is electrically opened by means of an operating coil 62 and said coil is directly energized through a circuit 64 from the current transformer 50. The coil 62 is set to operate at the same current setting as the relay 54.

It is a characteristic of this invention that the coil 62 operates instantaneously on overload to open the valve 44, thus to admit the inert gas into the cell before the tripping relay 54 has operated to effect the opening of the switch. The amount of inert gas that is introduced into the switch during this period is adapted to be such that it renders the atmosphere within the switch non-explosive. The switch thus opens under a load when it is surrounded by an inert atmosphere. Consequently any flame that may be expelled from the switch is extinguished upon entering the inert atmosphere and any oil vapor or gas that may be expelled from the switch can not form an explosive mixture with the atmospheric content of the cell since the inert gas is present in sufficient proportions to render the mixture non-explosive or so weakly explosive that any burning of the mixture will be without harm. The time period intervening between the opening of the valve 44 and the opening of the switch is adapted to be small, say one-half second or a second, so as not to delay unduly the protection afforded by the tripping relay and switch. This period, however, is amply sufficient to introduce a copious amount of high pressure inert gas into the cell.

The switch can be opened at any time by any well known arrangement, as the manual opening and closing switch 66, under the control of an operative and at such times the inert gas is not intended to be liberated, gas preferably being liberated only at such times as the switch opens automatically under overload.

No attempt has been made to illustrate a commercial embodiment of the invention as one skilled in the art will recognize the satisfactory types of apparatus desirable for the working of the invention.

I claim:

1. The method of preventing explosions in the vicinity of an oil immersed electric switch normally surrounded by an atmosphere which is combustible with the oil of the switch, which method consists in surrounding the switch with a non-combustible atmosphere at the time the switch is opened.

2. The method of preventing explosions in the vicinity of an oil immersed electric switch normally surrounded by atmospheric air which consists in replacing the air with a gaseous mixture which is incapable of supporting combustion at the time the switch is opened under loads sufficient to cause the expulsion from the switch of a burning or combustible material.

3. The method of preventing an explosion in the vicinity of an oil immersed electric switch which consists in liberating an inert gas into the atmosphere surrounding the switch in quantities sufficient to render the atmosphere non-combustible at the time the switch is opened under overload.

4. The method of preventing an explosion in the vicinity of an oil immersed electric switch which consists in liberating an inert gas into the atmosphere surrounding the switch in quantities sufficient to render the atmosphere non-combustible just prior to the opening of the switch under overload so that the atmosphere is non-combustible when the switch opens.

5. The method of operating an electric switch containing a combustible arc-quenching medium which consists in surrounding the switch with a non-combustible atmosphere immediately prior to and during the time that the switch opens.

6. The method of operating an electric switch containing a combustible arc-quenching medium and normally surrounded with air which consists in introducing into the air in the vicinity of the switch and immediately prior to the opening of the switch, an inert gas in such proportions that the mixture of the inert gas and air is incapable of supporting combustion immediately prior to and during the opening of the switch.

7. The method of operating a cell enclosed electric switch containing a combustible arc-quenching medium which consists in introducing an inert gas into the switch cell and about the switch in an amount sufficient to render the atmosphere therein incapable of supporting combustion prior to the opening of the switch and delaying the opening of the switch until the non-combustible atmosphere has been formed and then opening the switch.

8. The combination of an electric switch having an enclosing casing containing a combustible arc-quenching medium, an enclosing cell therefor, a source of inert gas, means for liberating inert gas into the interior of the cell and about the switch casing to form a non-combustible mixture with the air therein, means to open the switch, and means to delay the opening of the switch until after the operation of said liberating means.

9. The combination of an oil immersed electric switch, an enclosing cell therefor, a source of inert gas, instantaneously-operable means to liberate inert gas into the cell about the switch to form a non-combustible mixture with the air therein, time delayed means to open the switch, and means to effectively energize said liberating means and time delayed means simultaneously.

10. The combination of an oil immersed electric switch, an enclosing cell therefor, a source of inert gas, instantaneously operable means to liberate inert gas into the cell about the switch to form a non-combustible mixture with the air therein, time delayed means to open the switch, and means responsive to overload conditions in the circuit including the switch to effectively energize said liberating means and said time-delayed means simultaneously.

11. The combination of an oil immersed electric switch, an enclosing cell therefor, tripping means for the switch, a source of inert gas, means to liberate inert gas into the cell about the switch in quantities sufficient to form a non-combustible mixture with the air therein and means to delay the effective operation of said tripping means until after the formation of the non-combustible mixture.

12. The combination of an electric switch, an enclosing cell therefor adapted normally to contain air, a source of inert gas-forming material, means to liberate such inert material into the cell to form a non-combustible gaseous mixture with the air therein, and means to operate said liberating means only immediately prior to and during the opening operation of the switch.

In testimony whereof, I have signed my name to this specification.

GEORGE A. BURNHAM.